Aug. 25, 1959 — F. C. SCHWANEKE ET AL — 2,900,895
TEA BASKET AND VAPORIZER
Filed May 24, 1955 — 2 Sheets-Sheet 2

INVENTORS:
James E. Tucker and
Fred C. Schwaneke

United States Patent Office 2,900,895
Patented Aug. 25, 1959

2,900,895

TEA BASKET AND VAPORIZER

Fred C. Schwaneke and James E. Tucker, Chicago, Ill., assignors to Dormeyer Corporation, Chicago, Ill., a corporation of Illinois Application May 24, 1955, Serial No. 510,697

6 Claims. (Cl. 99—284)

This invention relates to a combination beverage maker and vaporizer, and more particularly to a device of the type indicated which has a basket member adapted to be removably secured upon the cover of the utensil so that it is movable therewith without danger of tea leaves or the like escaping into the beverage.

In brewing tea with currently available utensils, tea leaves are either placed directly in the water or escape into the brew when a basket is used during pouring or removal of the basket. This makes it difficult to control the strength and quality of the tea, and either clogs the pouring spout where a sieve is set therein or forms an undesirable sediment in the cup. Also, the operator is often scalded in removing the basket.

Conventional beverage makers are generally limited to one particular use, because their use for other purposes would taint the utensil and impair the taste of the beverage, and it has heretofore been necessary to buy separate equipment for making tea and for vaporizing and humidifying purposes respectively.

Accordingly, it is an object of the present invention to provide beverage maker which can also be used as a vaporizer and humidifier.

Another object is to provide a basket member for the utensil which will snap into secure engagement with the cover therefor and out of engagement therewith selectively, whereby tea may be brewed in the utensil and the basket removed therefrom by means of the cover member without danger of tea leaves escaping into the beverage.

Another object is to provide handles for the basket which will co-operate with the cover member of the utensil in achieving the foregoing objects of the invention.

Yet another object is to provide a basket and cover member which will afford circulation of steam from the utensil and through the basket to the ambient atmosphere while preventing entry of vapors into the utensil from the basket.

Further objects and advantages of the invention will become apparent as the description proceeds in accordance with the drawings, in which.

Figure 1:
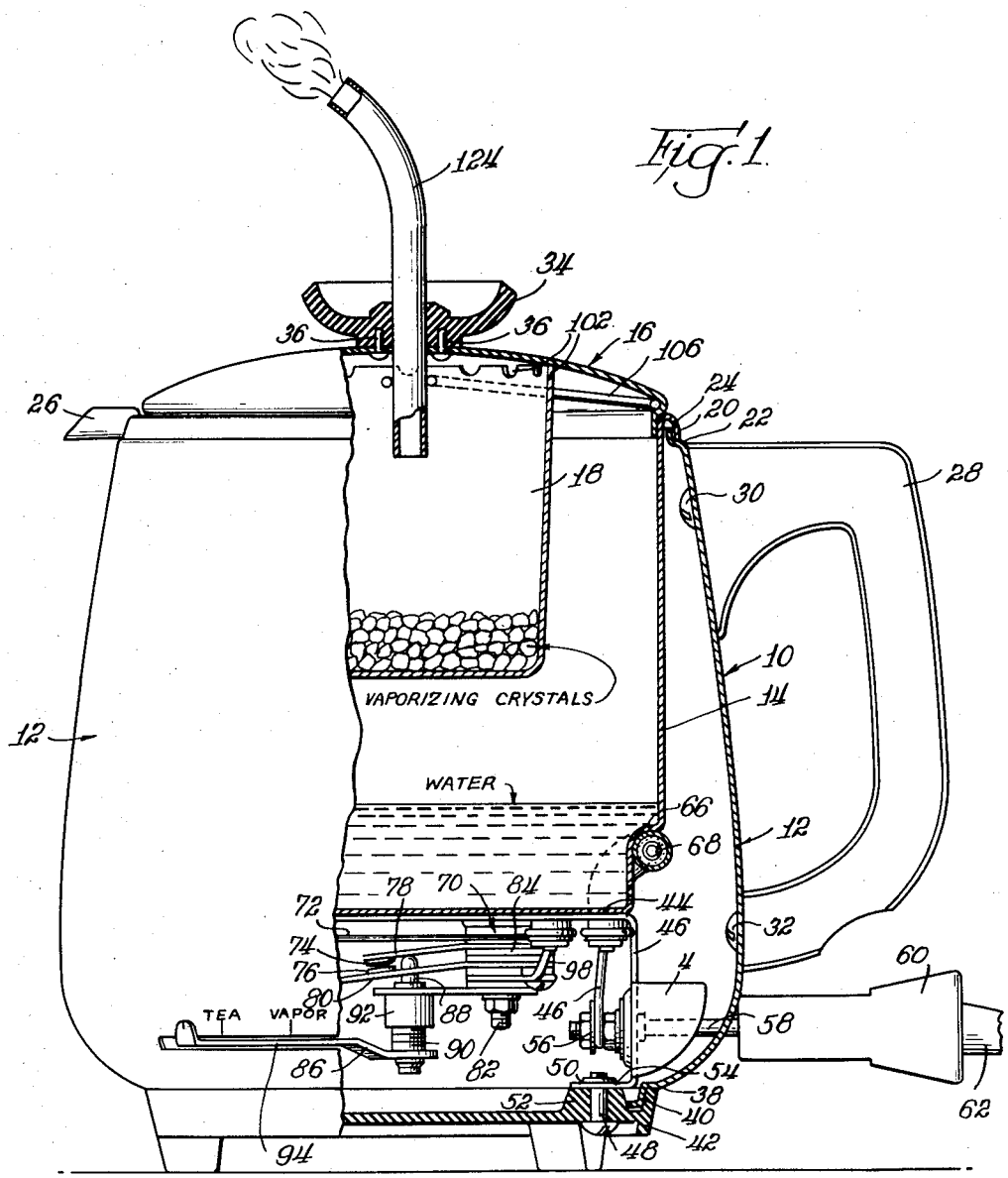
Fig. 1 is a side elevational view, partly broken away, of the combination tea-maker and vaporizer of the present invention.

Referring now to Fig. 1, the combination tea-maker and vaporizer of the invention is referred to generally by reference to numeral 10 and in a preferred embodiment includes a housing 12, a well portion 14, a cover 16 and a basket 18. The well portion 14 is provided with an outwardly and downwardly turned flange 20 which is adapted to seat upon the inwardly turned shoulder 22 and against an upstanding flange 24, and a spout 26 may also be secured thereto. A conventional handle 28 of suitable heat insulative material is affixed to the housing 12 by means of bolt elements 30 and 32, and a heat insulative handle member 34 is secured to the cover 16 by bolts 36 as will be hereinafter described.

The lower portion of the housing 12 is also offset inwardly to provide two seating surfaces 38 and 40 for a bottom plate 42 preferably formed of a heat resistant material such as porcelain or the like.

The bottom wall 44 of the well 14 has secured thereto by welding or other suitable means a metal bracket 46 which is bolted to the bottom plate 42 by bolts 48 received in internally threaded bosses 50 of the bracket and bosses 52 of the plate, the bosses 50 being formed integrally on depending flanges 54 of bracket 16.

Flange 54 supports electrical posts 56 bolted thereto and having prongs 58 adapted to be received in electrically connected relationship in the plug 60 secured to the electrical cord 62. Bracket 46 may also be provided with wing guides 64 for plug 58.

The well portion 14, which may be formed of any suitable heat-conductive metal, is inset at 66 to provide a shoulder against which is seated a metal encased unitary heating element 68, often referred to as a Calrod or Monorod and having the resistance portion thereof embedded in a heat conducting, electrically insulated refractory material.

The bracket 46 carries a thermostat 70 comprising a bimetal strip 72 and two electrical make-and-break contacts 74 and 76 carried by leaf springs clamped together at their base on a sleeve bolt 82, and having electrical insulating washers 84 disposed therebetween. The leaf springs 78 and 80 normally urge the contacts 74 and 76 to make contact, but one of them is adjustably movable away from the other by means of a handset control shaft 86 having a dielectric thrust pin 88 engaging the upper leaf spring 78. The lower spring 80 is subjected to deflection by an intermediate dielectric pin (not shown) carried by the bimetallic member 72. Shaft 86 is adapted to turn a stud 90 which is threadedly received in sleeve 92, and when it is adjusted laterally in relation to the indicia on the housing 12 adjacent slot 94 the pin is moved axially for corresponding adjustment of the leaf spring 78, which is calibrated with the external indicia for appropriate tea-making or vaporizing temperature settings as will be hereinafter described.

In the off position of the shaft 86 the upper leaf spring 78 is moved upwardly from the lower leaf spring 80 a distance such as to separate the contacts 74 and 76 under all possible conditions. When the shaft is moved to any other position, the two contacts are permitted to come together at an initial or resting position to close the circuit, which includes the heater 68, one end of the heater being connected across the house line by the extension cord 62 through the lead 96 and the other end being connected with the thermostat through the lead 98 and with the house outlet through another lead (not shown). As the temperature in the well 14 rises and is transmitted by conduction through bolt 82 to the thermostat, the temperature will approach the temperature set for the vessel by the shaft 86, the heat radiation from the wall of the vessel adding to the effect on the thermostat. When the given temperature is attained, the current is cut off by opening of the contacts 74 and 76. Cooling of the bimetallic element 72 will cause the heater to be turned on again before the temperature of the vessel falls appreciably.

The thermostat may be calibrated in relation to the indicia along slot 94 so that a suitable temperature for brewing tea will be developed when shaft 86 is positioned at the setting marked "tea" and so that a suitable vaporizing temperature is developed when the shaft is positioned at the setting marked "vapor."

Figure 2:
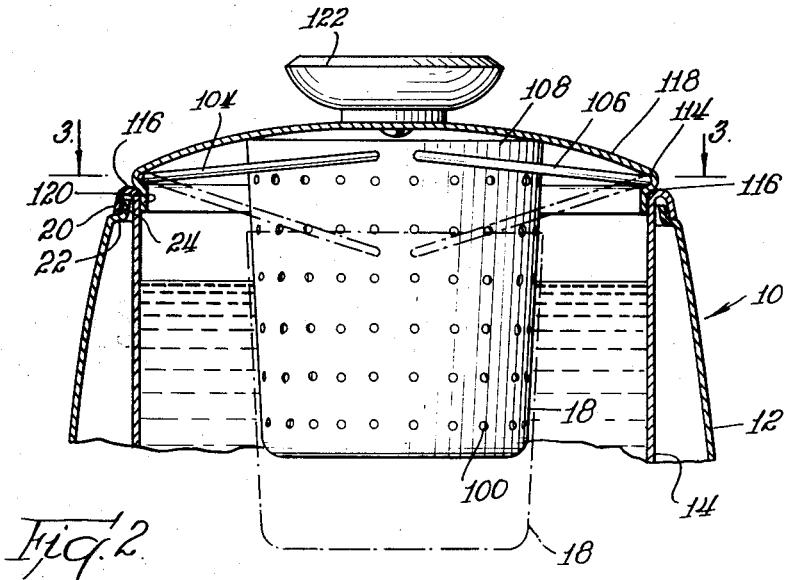
Fig. 2 is a fragmentary vertical sectional view.
Figure 3:
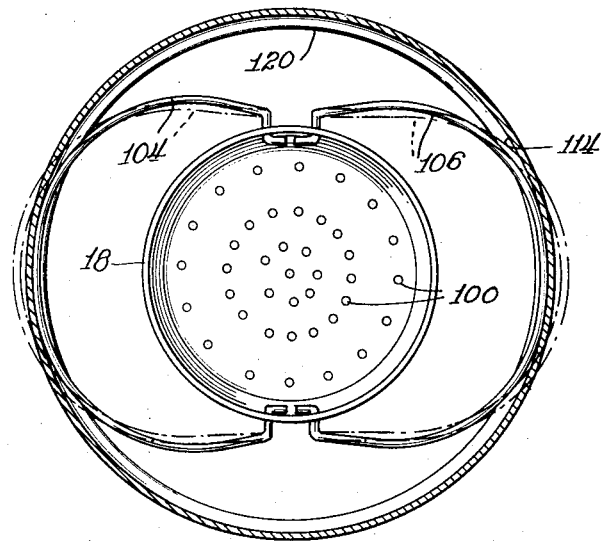
Fig. 3 is a horizontal sectional view taken along the line 3—3 of Fig. 2.

Referring now to Fig. 2, the basket 18 is suitably apertured, and may be provided with perforations 100 in the bottom wall and side wall thereof and with notches or serrations 102 along the substantially cylindrical upper marginal edge thereof, as will be hereinafter described. A pair of resilient arcuate handles 104 and 106 are journalled in predetermined proximate spaced relation to the rim 108 and to a given diameter thereof, and when the handles are disposed horizontally, their respective midpoints are normally spaced apart a distance which is substantially greater than the diameter of an annular recess 114, which is formed in the cover 16, as seen in Fig. 3. The recess 114 is preferably provided by an inset shoulder 116 extending beneath the margin of the top portion 118 of the cover and integrally formed with depending flange 120, the shoulder 116 and flange 120 being adapted to seat the cover securely against flange 20.

Referring again to Fig. 2, an angle is formed between the plane defined by the recess 114 and each of the handles 104 and 106 when the handles are set in the recess and the basket 18 is in abutting relation with the cover 16, which is substantially less than the angle formed between the handles and the plane of the recess when the handles are set in the recess and fully extended, as shown in solid line and dot and dash respectively. Accordingly, the basket is biased into positive engagement with the cover when the handles are in the position shown in solid line, and once it is moved axially upwardly past the position where the handles are disposed horizontally and engaged in the recess, it will snap in tightly against the cover. Correspondingly, when the basket is moved axially downwardly, it will spring out of engagement with the cover so that the basket may be held by the handles themselves. The relatively greater angle between the handles and recess in the position shown in dot and dash in Fig. 2 as compared with the position shown in solid line is the result of the aforementioned horizontal distance between the handles relative to the diameter of recess 114, the spacing of the journal points of the handles from the rim in relation to the depth of the cover from its apex to the plane of the said recess and the diameter of the rim 108 of the basket relative to the diameter 108 of the recess and the curvature of the top portion 118 of the cover, variations in the various dimensions and proportions being encompassed within the scope of the invention to the extent that the handles are adapted to bias the basket into snugly abutting relation with the cover as shown.

When the well 14 is filled with water to a level such as is indicated in Fig. 2 and the basket 18 filled with a suitable quantity of tea leaves and snapped into position on the cover the tea may be brewed and poured and the basket removed by means of the cover and insulated handle 122 thereon without any escape of the tea leaves into the brew or any danger of scalding.

Likewise, when it is desired to use the utensil as a vaporizer, a suitable quantity of chemical such as tincture of benzoin may be placed in a closed bottom basket and a predetermined quantity of water in the well 14, and with the shaft set at the "vapor" setting, steam will be produced continuously and will enter the basket to take up vapors from the chemicals contained therein. The cover 16 and handle 34 are accordingly provided with a central aperture through which may extend a vaporizing tube 124 adapted to vent the steam and vapor, and the steam continuously formed in the well will prevent any of the vapors formed in the basket from recirculating in the well, so that there will be no chemical traces in the well such as would impart a taint to tea subsequently brewed therein.

If desired, the basket 18 may be apertured only along the rim as shown at 102, to aid in producing a one-directional circulation of vapor or steam through the basket and the tube 124, although the embodiment of the basket shown in Fig. 2 may also be employed for both vaporizing or humidifying purposes.

Although we have herein described and set forth our invention in considerable detail, it will be understood that numerous changes may be made without departing from the spirit and principles thereof as defined in the following claims.

What is claimed is:

1. A combination tea-maker and vaporizer comprising a heating container for liquids, a closure for said container, a basket element and spring means on said basket element operable in one position to urge said basket element into engagement with said closure and in another position to urge said basket element out of engagement with said closure, said spring means comprising a pair of resilient arcuate handles having each end thereof pivotally secured in said basket, said closure having an annular peripheral recess adapted to engage said handles therein and having a diameter substantially less than the maximum distance between the outer arcuate centers of said handles.

2. In a liquid heating appliance comprising a heating container member, a closure member for the container member, one of said members having horizontally spaced recess portions, a basket element, and spring means engaging in said recess portions for supporting said basket in said container member including elements whose outermost extremities extend normally a distance horizontally greater than the distance between said recess portions and whose innermost extremities engage the basket above the level of said recess portions when the basket is disposed in its supported position, said closure being dished upwardly from said recess and said handles being journalled in said basket at points which are intermediate said recess and the apex of said closure in relation to the axis of said closure when said basket is in abutting relationship with said closure along its upper edge.

3. The construction according to claim 2 wherein the angle between each of said handles and the plane defined by said annular recess when said basket is in abutting relation to said closure along its upper edge being substantially less than the angle between each of said handles and the plane defined by said recess when said handles are engaged in said recess and said basket is in disengaged relation with said closure, whereby said basket is pressed against said closure by said handles when in abutting relation thereto.

4. A combination tea-maker and vaporizer comprising a heating container for liquids, a closure for said container, a basket element and a pair of resilient arcuate handles having each end thereof pivotally secured in said basket, said closure having an annular peripheral recess adapted to engage said handles therein and having a diameter substantially less than the maximum distance between the outer arcuate centers of said handles whereby to bias said basket selectively into secure abutting relation with said closure and into disengaged relation with said closure, said basket being in abutting relation to the portion of said closure overlying said basket and where being apertured for movement of fluid from said container into said basket.

5. The construction according to claim 4 wherein said basket apertures comprise serrations along its upper edge to afford passage of steam as said fluid when steam is formed in said container, and said closure is provided with a vaporizer tube extending therethrough and into said basket.

6. The construction according to claim 4 wherein said basket apertures comprise perforations throughout its wall portions and said fluid is water within said container whereby tea may be formed in the container while the tea leaves are confined in the basket element during insertion of the basket within the container and removal from the container by means of the closure engaged therewith.

References Cited in the file of this patent

UNITED STATES PATENTS

| | | |
|---|---|---|
| 397,257 | Tarring | Feb. 5, 1889 |
| 485,993 | Snyder et al. | Nov. 8, 1892 |
| 545,936 | Bentall | Sept. 10, 1895 |
| 772,498 | Chapman et al. | Oct. 18, 1904 |
| 823,670 | Denison | June 19, 1906 |
| 1,008,861 | Piaseczny | Nov. 14, 1911 |
| 1,307,745 | Marcus | June 24, 1919 |
| 1,981,765 | Weiss | Nov. 20, 1934 |
| 2,061,148 | Fischer | Nov. 17, 1936 |
| 2,522,718 | Huck | Sept. 19, 1950 |
| 2,606,276 | Maguth | Aug. 5, 1952 |
| 2,628,738 | Hilldale | Feb. 17, 1953 |